US008694437B2

(12) United States Patent
Hochfield et al.

(10) Patent No.: US 8,694,437 B2
(45) Date of Patent: Apr. 8, 2014

(54) SMARTCARD-BASED VALUE TRANSFER

(75) Inventors: Barry Sim Hochfield, Glasgow (GB);
Anthony Breslin, East Kilbride (GB);
Michael Peters, Glasgow (GB)

(73) Assignee: ECEBS Limited, Glasgow (GB)

( * ) Notice: Subject to any disclaimer, the term of this patent is extended or adjusted under 35 U.S.C. 154(b) by 1008 days.

(21) Appl. No.: 10/548,762

(22) PCT Filed: Mar. 15, 2004

(86) PCT No.: PCT/GB2004/001094
§ 371 (c)(1),
(2), (4) Date: Aug. 15, 2006

(87) PCT Pub. No.: WO2004/081889
PCT Pub. Date: Sep. 23, 2004

(65) Prior Publication Data
US 2007/0094149 A1    Apr. 26, 2007

(30) Foreign Application Priority Data
Mar. 13, 2003  (GB) .................................. 0305806.2

(51) Int. Cl.
G06Q 20/00    (2012.01)

(52) U.S. Cl.
USPC .................... 705/65; 705/64; 705/66; 705/68

(58) Field of Classification Search
USPC ........................................ 705/65, 64; 380/24
See application file for complete search history.

(56) References Cited

U.S. PATENT DOCUMENTS

| | | | |
|---|---|---|---|
| 5,175,416 A * | 12/1992 | Mansvelt et al. ............. | 235/379 |
| 5,440,634 A | 8/1995 | Jones et al. | |
| 5,455,407 A * | 10/1995 | Rosen .............................. | 705/69 |
| 5,623,547 A * | 4/1997 | Jones et al. ...................... | 705/68 |
| 5,930,363 A * | 7/1999 | Stanford et al. ................. | 705/65 |
| 6,467,685 B1 * | 10/2002 | Teicher ........................... | 235/379 |
| 2003/0050899 A1 * | 3/2003 | Tushie et al. .................... | 705/65 |
| 2003/0097344 A1 * | 5/2003 | Chaum et al. ................... | 705/75 |
| 2004/0060979 A1 * | 4/2004 | Sukeda et al. .................. | 235/375 |

FOREIGN PATENT DOCUMENTS

| | | |
|---|---|---|
| EP | 0 668 579 A | 8/1995 |
| EP | 0 793 203 A | 9/1997 |
| EP | 1 072 995 A | 1/2001 |
| WO | WO 00/74004 A | 12/2000 |

OTHER PUBLICATIONS

"ITSO Specification for Interoperable Public Transport Ticketing Using Contactless Smartcards", 2001, issue 1.2, pp. 2-43.*

(Continued)

Primary Examiner — Chrystina Zelaskiewicz
(74) Attorney, Agent, or Firm — Gardere Wynne Sewell LLP

(57) ABSTRACT

In a value transfer scheme, users are provided with programmable devices, for example, smart cards, capable of carrying data representing at least one available commodity value. Data representing user accounts is held at a remote processing station. Transactions between users are effected by the off-line exchange of data between users' respective smartcards, the exchanged data containing a record of each transaction entered into. The user account data for each user's account held at the remote processing station is updated only subsequently when the user's smartcard is on-line to the remote processing station and data therefrom is uploaded to the remote processing station. The scheme of the invention can, conveniently, be based around the ITSO scheme which is used to govern the secure transfer of data. The scheme is capable of providing a secure multi-commodity value transfer system.

9 Claims, 1 Drawing Sheet

(56) References Cited

OTHER PUBLICATIONS

White, Ron, "How Computers Work", Millennium Ed., Que Corporation, Indianapolis, IN, 1999.*

International Search Report of PCT/GB2004/001094.
D.W. Davies, "Smart Cards, Digital Signatures and Negotiable Documents", International Conference on Secure Communication Systems, Feb. 22-23, 1984, IEE Conference Publication No. 231.

* cited by examiner

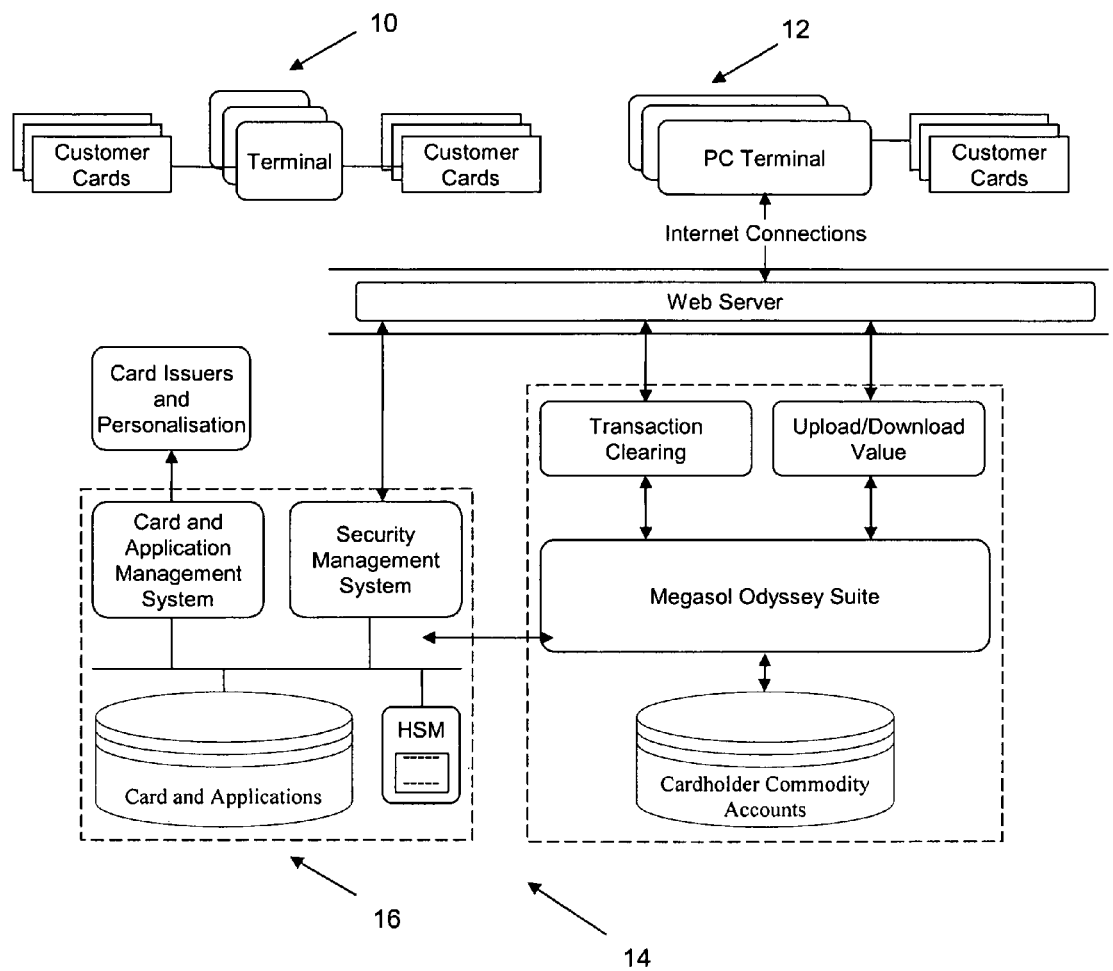

SMARTCARD-BASED VALUE TRANSFER

The present invention relates to a scheme to enable value transfers of commodities with multiple denominations using smartcards, including card-to-card transactions. In this context, the term 'commodity' is used to denote anything which is perceived as having a value, including, for example, a currency.

Card-to-card transactions and smartcard-based 'electronic purse' schemes have been the subject of research and design activity over the past twenty years. A number of different schemes have been set up, each using differing standards and technologies, for example, the 'Mondex' scheme provides 'loss-less' value transfer card-toward. Any new scheme should ideally be able to operate with at least a proportion of existing schemes. The approach proposed is, therefore, to utilise 'open standards' wherever possible.

The overall goal of any new scheme is to create a viable alternative payment system to that provided by bankcards. The circulation of value should be stimulated through the ubiquitous convenience of an off-line transaction capability, while, at the same time this circulation must be controlled and monitored to provide strong governance to prevent fraud, and to enable the collection of revenues for the provision of the scheme, i.e. cardholders should be required, every so often but not so often as to be perceived an inconvenience, to go on-line to continue to use the service.

It should also be possible to transfer value to a card that, previously, did not trade in a particular commodity from a particular broker. This has the added benefit from the broker's perspective of bringing a new account holder, as in order to register that newly acquired value, a new account must be opened.

For such a scheme to be workable, that is, for it to be secure enough to be practicable, any such scheme should include the following features:

Card-to-host logon should provide remote authentication utilising two separate factors to secure identification of account holder, in general, possession of the card, and knowledge of a separate PIN (personal identification number).

The commodities exchange functionality should permit transactions between card and host, and between one card and another card, that is, both face-to-face and remote transactions.

Multiple commodities from multiple brokers should preferably be present on the same card. If this is to be achieved then this requirement implies an Open System.

It should be possible to introduce new commodities, for example, silver, palladium, etc. into the scheme, either from existing or new brokers and onto cards already in circulation.

There should be provision for interchange between different brokers'commodities, in other words, the technology used must enable the scheme to become an Open System, where commodity brokers and their competitors can interoperate within the same card-base.

The scheme should have the capability to recognise cards used by 'merchants' as opposed to those of 'consumers', so that different deposit fee structures can be applied.

There should be provision made, in a customer-merchant situation, to prevent a transaction failing because of 'insufficient funds' on the customer card. In this case, the system should support the option for the card to go online to the host to download more available funds to the cardholder and then allow the transaction to retry.

In putting in place a scheme of the kind outlined above, there is a choice of open standard technologies available to adopt. On the surface, the requirements for such a scheme are very similar to the pre-authorised off-line debit profiles found in EMV (Europay, MasterCard & Visa) 2000 [see EMV2000 Integrated Circuit Card Specification for Payment Systems, Book 1: Application Independent ICC to Terminal Interface Requirements, EMVCo, LLC ("EMVCo"), Version 4, December 2000; M/Chip 4 Card Application Specifications for Debit and Credit, Version 1.0 dated October 2002; and Visa Integrated Circuit Card: Card (ICC) Specification, Visa International, Versions 1.4, October 2001]. However, these schemes do not cater to multiple commodities in an open manner, in particular, they do not provide for dynamic management of the addition, deletion or modification of such commodities. More fundamentally, EMV is not capable of handling card-to-card transactions.

In accordance with the invention, there is provided a value transfer scheme wherein users are provided with programmable devices capable of carrying data representing at least one available commodity value, and data representing user accounts are held at a remote processing station; wherein transactions between users are effected by the off-line exchange of data between users'respective programmable devices, the exchanged data containing a record of the or each transaction entered into; and wherein the user account data for each user's account held at the remote processing station is updated only subsequently when that user's programmable device is on-line to the remote processing station and data therefrom is uploaded to the remote processing station.

The invention also provides both an interface device for use in the scheme and a programmable device which carries at least one data file representing an available commodity value and means for interfacing with the programmable device of another user offline by means of the interface device.

A scheme in accordance with the invention will now be described in detail, by way of example, with reference to the drawing, which is a block diagram showing the high-level architecture of a scheme in accordance with the invention.

The scheme of the invention is based around technology derived from the ITSO scheme which is an open standard, as proposed above. For the purposes of this document, the term 'ITSO' is intended to denote the Interoperable Ticketing Transaction Scheme for smartcards developed by UK Government and incorporated in European Standard EN 1545, in any of the versions currently available or which become available in future.

ITSO provides a standard set of specifications, an organisation, an open scheme, and a technical architecture. It has enabled the creation of a number of ticketing based smartcard applications, both contact and contactless.

The EMV scheme mentioned above provides a payment method based on credit or debit to one bank's card-carrying customer, while at the same time enabling payment underwriting and collection to another bank's merchant customer.

ITSO operates on somewhat similar principles, however it ensures trust between the parties by enforcing the scheme's security.

In any multi-user scheme, it is essential that the parties taking part—the merchants—must receive their fair share of the income generated or value transferred. In order to achieve precise revenue apportionment, one must create a fully accounted scheme which can capture and subsequently clear each and every transaction with guaranteed integrity and completeness. Also, any log of transaction records must have its integrity ensured and it's subsequent transfer for clearance and apportionment guaranteed.

ITSO achieves these various requirements by enabling and enforcing security off-line. This is achieved by providing a tamper resistant Secure Access Module (the 'ITSO SAM' or 'ISAM') which is present, in transport schemes, in every ticketing machine and turnstile, and which is managed by ITSO's Security Manager module. The ISAM participates in every ticket transaction by acting as the 'policeman' or security enforcer of the scheme. It checks integrity of every ticket presented and certifies every transaction. In the scheme of the invention, it is anticipated that each and every terminal which interfaces with cards, whether on-line or off-line will incorporate an ISAM.

The ITSO scheme also specifies a variety of soft ticket templates secured by the ISAM's cryptographic functionality. Within these ticket templates, ticket products 'owned' by any scheme operator can be created and processed by virtue of the fact that each and every ticket product can have its own key, also stored in the ISAM and again managed by the ITSO Security Manager. These soft tickets are independent of the card platform technology. This enables any card which conforms with ISO 14443, whether it be memory only or CPU based, to carry an ITSO ticket wallet either alone on a single application card, or alongside other applications on a multi-application card.

At the heart of the ITSO scheme is the ITSO Secure Application Module, the 'ISAM', the underlying platform for which is an ISO 7816 compliant High Capacity Card. The card has over 4 Megabytes of secured memory and the ISAM can communicate at over 600 Kb/s (ISO 7816 T=1). It includes a full set of hardware accelerated cryptographic capabilities, such as RSA and triple DES. Typically, this can all be provided in a standard ISO 7810 and ID-000 form-factor to fit into a socket as for a GSM SIM, of the kind used in mobile telephones. The ISAM has been developed to meet the internationally recognised security assurance methodology, Common Criteria at AEL 4 high.

In the ITSO scheme, each card may carry one or more 'e-tickets'. These are acquired from merchants taking part in the scheme in return for payment. When a card-user is acquiring e-tickets from the merchant the data files which form the e-tickets are loaded onto the smartcard from an interface device containing an ISAM. When the card-holder wishes to use the tickets he has purchased, in order to travel, the e-ticket files are downloaded from the smartcard to the ISAM-containing interface device. It will be appreciated that in the conventional ITSO scheme, there is no provision for a two way flow nor is there any provision for card-to-card transactions. At first glance, therefore, the ITSO scheme has some of the same disadvantages as a basis for a multiple commodity value transfer scheme as the EMV scheme discussed above.

However, we have appreciated that the ITSO scheme is capable of adaptation to provide a workable value transfer scheme with the functionality outlined above.

The scheme of the invention relies on the provision of multiple 'e-chequebooks', one for each commodity account, resident on each card. The structures for these e-chequebooks are based on ITSO ticket templates [see ITSO Specification Part 2: Card and Basic Data structure Version 2 November 2000 and ITSO Specification Part 5: Card format and Data Records Version 2 November 2000, incorporated herein by reference]. Each e-chequebook is, in fact, a digital certificate, that is, a set of data, the integrity of which is enforced by the use of cryptography. Multiple e-chequebooks representing multiple accounts from multiple commodity brokers can be loaded or deleted on a card even in the field, assuming the card issuer gives permission. Thus, the scheme will permit multiple commodities from multiple brokers to be present on the same card.

The keys used to verify and modify the contents of each e-chequebook are also stored in each card. As each e-chequebook can have its own key, the privacy and security of the account is assured across the entire scheme. The Scheme has a Security Management System (SSMS) that is responsible for the generation and usage of all keys. There is also an Application Management System (AMS) responsible for the secure loading and deletion of e-chequebooks, which, in turn, is reliant on keys managed by the SSMS.

Transactions between card-holders are effected by transferring electronic cheques ('e-cheques') between cards, off-line.

The e-chequebooks are analogous to ITSO IPEs (Interoperable Product Entity: ITSO terminology for an e-ticket), and the cheques to ITSO ticket transaction records. The secure loading and deletion of cheques and the host-to-card increment/decrement of the balance In each cheque-book [see ITSO Specification Part 4: Back Office Systems Version 2 November 2000, incorporated herein by reference] is managed by the ITSO Secure Frame messaging [see ITSO Specification Part 7: Security Access Module Version 2 November 2000, incorporated herein by reference].

Unlike the EMV scheme, the 'e-cheques' do not themselves change the commodity values held in some form of electronic purse or account, but, rather, act as a record of a transaction which is to take place in the future. This is exactly analogous to cheques written on a conventional bank account; it is not the writing and handing over of the cheque which effects the transfer of funds to the recipient but, rather the clearing of the cheque through the recipient's bank account.

Card to card transactions can be repeated off-line until either there is no more available memory to store new 'cheques', or, alternatively, a 'cheques counter' is tripped. At this point the card must go on-line to the scheme host to 'cash the cheques', i.e. the transactions are uploaded from the card to be cleared through a central exchange processing centre.

When the card goes on line to the host, its unique ID is first passed to the SSMS. The SSMS will send a card-unique challenge in the form of a message secured by the scheme keys. Only a single valid card can respond correctly. This response will also depend on the correct entry of a cardholder validation method such as a PIN. This action therefore serves as a secure remote login, using two-factor remote authentication as proposed in the list of desiderata set out above. The unique ID allows the host to recognise 'merchant' cards and distinguish them from those of consumers.

Thus, in the scheme of the invention, e-cheques are exchanged between cards off-line, until the user goes on-line to the 'back office', that is, the central processing location for the scheme. At that point, the e-cheques are downloaded and electronic purses and accounts updated on-line.

As mentioned above the ITSO transport-related scheme itself does not require provision for card-to-card transactions and so we have had to modify the ITSO structure to allow for this in the value transfer scheme of the invention.

When two cards interface, the presence of compatible e-chequebooks is verified, and, upon authorization, in the form of a cardholder verification method, two 'e-cheques' are created and exchanged. One of these, analogous to a paper cheque, acts to increment the e-chequebook balance on one card, and the other to perform the corresponding complimentary decrement of the balance in the e-chequebook in the other card, analogous, perhaps, to the record kept on the cheque-book stub in a paper system.

The cardholder verification, under present systems, is likely to involve provision of a PIN but this can be modified to other cardholder verification method, such as biometrics, in the future.

If the second card does not have the required e-chequebook then providing the card permissions allow a new e-chequebook to be created into which the value is added. Thus, the functionality of the scheme proposed permits easy introduction of new commodities, when required.

If, in a customer-merchant situation, a transaction fails due to insufficient funds being available on the customer's car, the customer card may go on-line to the host to download more available funds and then allow the local transaction to try again. This operation may be entirely transparent to both the merchant and customer. This is only possible, of course, where, as is usual, the merchant terminal is connected to the central processing location.

The high-level architecture of the scheme in accordance with the invention is shown in FIG. 1. At 10 there is shown schematically the situation which holds when off-line card-to-card transactions are carried out. Each card-holder's card interfaces with a local terminal which is not connected to the central processing location 14 or 'back room'.

When a card-holder needs to go on-line, the card interfaces with a terminal 12 connected, for example, by means of the internet or other computer network, with the back room 14 so that existing e-cheques can be cleared and values for accounts or electronic purses up- or downloaded. Part of the back room operation 16 also deals with the issuing and personalisation of new cards.

Where card-to-card transactions are to take place as at 10 in FIG. 1, the scheme of the invention operates as follows.

The sequence of commands shown in Table 1 below between terminal and cards is proposed to conduct a card-to-card value transfer based on the ITSO standard:

TABLE 1

| TERMINAL | Card1 | Card2 | Notes |
|---|---|---|---|
| Mutual Auth | → | | Use ITSO BEGIN/Ext Auth |
| Mutual Auth | | → | Add Shell Int/Ext Auth-session key generated for secure messaging |
| Read Binary DIR | → | | PIN SE will stop read if no PIN |
| Verify DIR | → | | |
| Read Binary DIR | | → | PIN SE will stop read if no PIN |
| Verify DIR | | → | |
| Read Binary IPE 1 | → | | PIN SE will stop read if no PIN |
| Verify IPE 1 | | → | Card2 now has a verified copy of Card 1 IPE |
| Read Binary IPE 2 | | → | PIN SE will stop read if no PIN |
| Verify IPE 2 | → | | Card1 now has a verified copy of Card2 IPE |
| Subtract Card1 | | → | New Command<br><br>Card2 internally creates a MODIFY VALUE IPE command to deduct value field of Card1<br><br>Card2 generates an internal IMAC command to log that Card1 was deducted. |
| Add Card2 | → | | New Command<br><br>Card1 is passed the modified Card1 IPE. It can calculate how much has been deducted. It will internally issue a modify Value IPE to the Card2 IPE adding the amount. It can Log this with an IMAC and store it's own Card1 IPE. |
| Updated Binary IPE2 | | → | Modified IPE2 stored back in Card2<br><br>We may have to make this a controller function to make sure it adds it to the correct place and generate a IMAC log |

First of all mutual authentication of the two cards is carried out by the terminal; in each case the card-holder is required to supply a PIN or other means of verifying the card's authenticity. If the PIN or other verification is not supplied, then the transaction will cease.

The terminal application (the ISAM) then reads the binary DIR from each card and verifies it and then reads the e-chequebook value (IPE1) from the first card, Card1, verifies it and writes it to the other card, Card2. The ISAM then reads the corresponding e-chequebook value (IPE2) from the second card, Card2, verifies it, and writes it to Card1, so that each card now has a verified copy of the e-chequebook value of the other card.

The second card, Card2, then creates internally a MODIFY VALUE IPE command to subtract the desired amount from the value of the e-chequebook IPE1 to create a modified version of IPE1. It also creates an internal IMAC command to log the fact that the amount has been deducted from Card1.

The terminal then reads the modified value IPE1 from Card2 and passes it to the other card, Card1. Card1 can then calculate how much has been subtracted from its own IPE and internally issues a MODIFY VALUE IPE command to add that amount to IPE2. Card1 logs the transaction by creating an IMAC command to record the fact that the amount has been added to the IPE of Card2.

The terminal then reads the modified IPE2 from Card1 and writes it back to Card2. Preferably, the terminal also generates an IMAC log to record the transaction details.

The terminal interfaces with the cards to update the running totals for the e-chequebooks held on the cards, although this information is not updated against the card-holders accounts until they go on-line to the host, and also, by means of the 'e-cheques' in the form of the IMAC logs, creates a record of each transaction affecting the e-chequebook.

Thus, the scheme of the present invention is capable of providing a multiple commodity value transfer scheme which permits the desirable features listed above, including, in particular, card-to-card transactions off-line from the central processing location.

The invention claimed is:

1. A method for calculating a commodity transfer on both a first and second programmable hardware device by electronic communication between the first programmable hardware device and the second programmable hardware device, the method comprising the steps of:
    storing on the first programmable device a first data item including a first value of the commodity owned by a first user, wherein the first user is an account holder of a first account;
    storing on the second programmable device a second data item including a second value of the commodity owned by a second user, wherein the second user is an account holder of a second account;
    sending of the first value from the first programmable hardware device to the second programmable hardware device;
    sending of the second value from the second programmable hardware device to the first programmable hardware device;
    subtracting by the second programmable hardware device a transfer value from the received first value to create a modified first value;
    sending of the modified first value from the second programmable hardware device to the first programmable hardware device;
    adding by the first programmable hardware device the transfer value to the received second value to create a modified second value;
    sending of the modified second value from the first programmable hardware device to the second programmable hardware device.

2. The method of claim 1, wherein the electronic transaction is effectuated through a terminal in electronic communication with the first and second programmable hardware devices:
    wherein sending of the first value comprises retrieving by the terminal of the first value from the first programmable hardware device and verifying the first value prior to sending the first value to the second programmable hardware device; and
    wherein sending of the second value comprises retrieving by the terminal of the second value from the second programmable hardware device and verifying the second value prior to sending the second value to the first programmable hardware device.

3. The method of claim 1, wherein the first and second programmable hardware devices are smartcards.

4. The method of claim 1, wherein the commodity is a monetary commodity and the first and second values are monetary values.

5. The method of claim 1, wherein the commodity is a non-monetary commodity and the first and second values are amounts of the non-monetary commodity.

6. The method of claim 1, further comprising:
    in response to receipt of the modified first value, creating a log record that the transfer value has been added to the second value of the second user;
    uploading information from the first programmable hardware device comprising the log record and the modified first value to a remote processing station, wherein the remote processing station stores data representing a first account associated with the first user; and
    updating by the remote processing station of said first account to reflect subtraction of the transfer value from the first account.

7. The method of claim 1, further comprising:
    in response to creation of the modified first value, creating a log record that the transfer value has been deducted from the first value of the first user;
    uploading information from the second programmable hardware device comprising the log record and the modified second value to a remote processing station, wherein the remote processing station stores data representing a second account associated with the second user; and
    updating by the remote processing station of said second account to reflect addition of the transfer value to the second account.

8. The method of claim 1, wherein the first programmable hardware device also stores a third data item including a third value of a different commodity owned by the first user and the second programmable hardware device stores a fourth data item including a fourth value of said different commodity owned by the second user; and
    wherein the commodity is a monetary commodity and the first and second values are monetary values; and
    wherein the different commodity is a non-monetary commodity and the third and fourth values are amounts of the non-monetary commodity.

9. The method of claim 1, wherein the first programmable hardware device also stores a third data item including a third value of a different commodity owned by the first user and the second programmable hardware device stores a fourth data item including a fourth value of said different commodity owned by the second user; and
    wherein the commodity is a non-monetary commodity and the first and second values are amounts of the non-monetary commodity; and
    wherein the different commodity is a monetary commodity and the third and fourth values are monetary values.

* * * * *

UNITED STATES PATENT AND TRADEMARK OFFICE
CERTIFICATE OF CORRECTION

| | | |
|---|---|---|
| PATENT NO. | : 8,694,437 B2 | Page 1 of 1 |
| APPLICATION NO. | : 10/548762 | |
| DATED | : April 8, 2014 | |
| INVENTOR(S) | : Barry Sim Hochfield et al. | |

It is certified that error appears in the above-identified patent and that said Letters Patent is hereby corrected as shown below:

On the Title Page:

Item (57) in the 6th line of the Abstract, please replace [users'respective] with -- users' respective --.

In the Specification:

At column 1, line number 14, please replace [card-toward] with -- card-to-card --.
At column 1, line number 52, please replace [brokers'commodities] with -- brokers' commodities --.
At column 2, line number 9, please replace [Versions] with -- Version --.
At column 2, line number 21, please replace [users'respective] with -- users' respective --.

Signed and Sealed this
Fifteenth Day of July, 2014

Michelle K. Lee
*Deputy Director of the United States Patent and Trademark Office*